Jan. 17, 1967 L. LINNER ETAL 3,298,760
ANTIFRICTION BEARING

Filed May 4, 1964 2 Sheets-Sheet 1

Inventors
Ludwig Linner
Heinrich Korrenn
Rudolf Mann
By Stevens, Davis, Miller & Mosher
Attorneys Jan. 17, 1967   L. LINNER ETAL   3,298,760
ANTIFRICTION BEARING Filed May 4, 1964                                              2 Sheets-Sheet 2

Inventors
Ludwig Linner
Heinrich Korrenn
Rudolf Mann
By Stevens, Davis, Miller & Mosher
Attorneys 3,298,760
ANTIFRICTION BEARING
Ludwig Linner and Heinrich Korrenn, Schweinfurt, and Rudolf Mann, Mannheim-Kafertal, Germany, assignors to Kugelfischer Georg Schafer & Co., Schweinfurt, Germany
Filed May 4, 1964, Ser. No. 364,687
Claims priority, application Germany, May 8, 1963, K 49,687
10 Claims. (Cl. 308—187)

This invention relates to an immersion-lubricated antifriction bearing.

In some cases, antifriction bearings are lubricated with grease, while in other cases oil is used for this purpose. In the case of antifriction bearings which are subject to relatively light loads, the use of grease as a lubricant is preferred. In most of the antifriction bearings lubricated with grease it is difficult to replenish the grease supply as it is necessary to apply the grease to the rolling and sliding surfaces of the bearing, this, however, is impeded by the relatively high viscosity of the grease. Moreover, it is impossible to cause the grease to circulate, this, in turn, renders it impossible to cool the bearing by cooling the lubricant. In contrast to this, a suitable grade of oil whose viscosity may be adjusted in the desired manner by using a suitable composition of the oil affords several advantageous potentialities, the more important of these being the possibility of utilizing both gravity and centrifugal forces to enhance proper lubrication of a bearing.

An antifriction bearing whose axis extends in a horizontal direction can be lubricated in an extremely simple manner by the use of the immersion lubrication method. In such a case the oil supply contained in the housing of the bearing should be such that, with the bearing at rest, the lowermost rolling member of the bearing is immersed into the oil up to about one-half of its diameter. In cases, however, in which the oil serves not only to lubricate the antifriction bearing but also serves to cool the bearing in order to dissipate the large amount of heat generated under high-load conditions, or where it is desired to provide a large supply of oil in the bearing housing in order to extend servicing periods, there being in many cases no sufficient room for the accommodation of such a large oil supply, the immersion lubrication method is replaced by the use of recirculated oil or of an oil mist. In the former case, there is either provided an oil pump serving to supply the antifriction bearing with pressurized oil, or circulation of the oil is caused by oil slinger rings or discs arranged to rotate together with the shaft carried by the bearing. Lubrication by oil mist which is conventionally used to lubricate the big and small end bearings of internal combustion engines operating on the two-stroke principle, is of particular advantage in the case of antifriction bearings operating at high speeds, as oil friction is reduced to a minimum. Except for such engines as well as gear transmissions in which certain parts of the engine or the rotating gear wheels, respectively, withdraw oil from an oil sump and thus produce an oil mist, the production of a suitable oil mist will require the use of suitable structural features.

In the case of high-speed bearings operating under high loads, the expense incurred by the use of circulating-oil or oil-mist lubrication appears to be well justified. Where the bearings have to operate under relatively light loads, and where use can be made of the immersion lubrication system, the higher expenses caused by the aforementioned systems has usually been avoided. Therefore, with the exception of bearings having a nonsymmetrical cross-section such as tapered roller bearings which have been known to produce a certain pumping action in operation, no provisions for oil circulation could be made in the last-mentioned case.

There have already been known certain immersion-lubricated antifriction bearings whose rotating parts cause the lubricant to be introduced into an external piping system. However, the rotating parts serving to circulate the oil are not constituted by component parts of the bearings proper, but they are parts which are additionally provided in an antifriction bearing of conventional construction. In the heretofore known bearings of this type, such additional parts or formations are constituted, for example, by helical recesses or special oil catching plates or baffles. The use of such additional parts or formations, however, leads to more expensive constructions, since the bearings have to be built to special specifications. Besides that, the capacity of the oil circulating means provided in the bearings is relatively small.

These deficiencies of the known immersion-lubricated antifriction bearings the rotating parts of which cause the lubricant to be introduced into an external piping system are eliminated according to the invention by providing for the oil pumping action to be produced exclusively by the hydrodynamic pressure built up in the gap between the skirt surface of a cage and the associated guiding surface of the stationary outer bearing race, the oil escaping from the bearing by way of a port provided at the lowermost point of the said guiding surface. This arrangement provides for a continuous circulation of the lubricant during operation of the bearing without necessitating any modification of a commercial type antifriction bearing, the circulation of the lubricant being caused by a pressure head meeting all requirements regardless of the application of the bearing. Moreover, the antifriction bearing of the invention may be used in an advantageous manner for the purpose of controlling the oil level in the bearing housing if there is connected to the oil drain hole of the bearing housing a standpipe serving to store the oil displaced from the housing when the bearing is operating at a high rate of speed. This standpipe automatically permits the stored oil to flow back into the bearing housing upon the rotary speed of the bearing being reduced. Such an effect cannot be achieved by any of the heretofore known arrangements.

According to another feature of the invention it is of particular advantage to make use of the aforedescribed pumping action in a double-row self-aligning roller bearing arranged in the manner described, it being understood that such bearings are in most cases subjected to high loads and thus require dependable and uniform lubrication, it being further understood that, according to the principal feature of the invention, these provisions can be made in a particularly simple and inexpensive manner. It should be further appreciated that the invention may also be applied to cylindrical roller and ball bearings operating under high loads.

According to still another feature of the invention, there may be provided, in communication with the hole extending through the outer race of the bearing, a conduit or pipe leading back to the bearing housing, the pipe serving to recirculate the lubricant, there being connected in the pipe, if desired, a lubricant cooler and/or a storage reservoir. According to the invention, there may be provided in the lubricant circulation path at least one additional bearing which is to be supplied with lubricant.

Other objects and features of the invention will become apparent as the description proceeds, especially when taken in conjunction with the accompanying drawing, illustrating certain preferred embodiments of the invention wherein.

Figure 1:
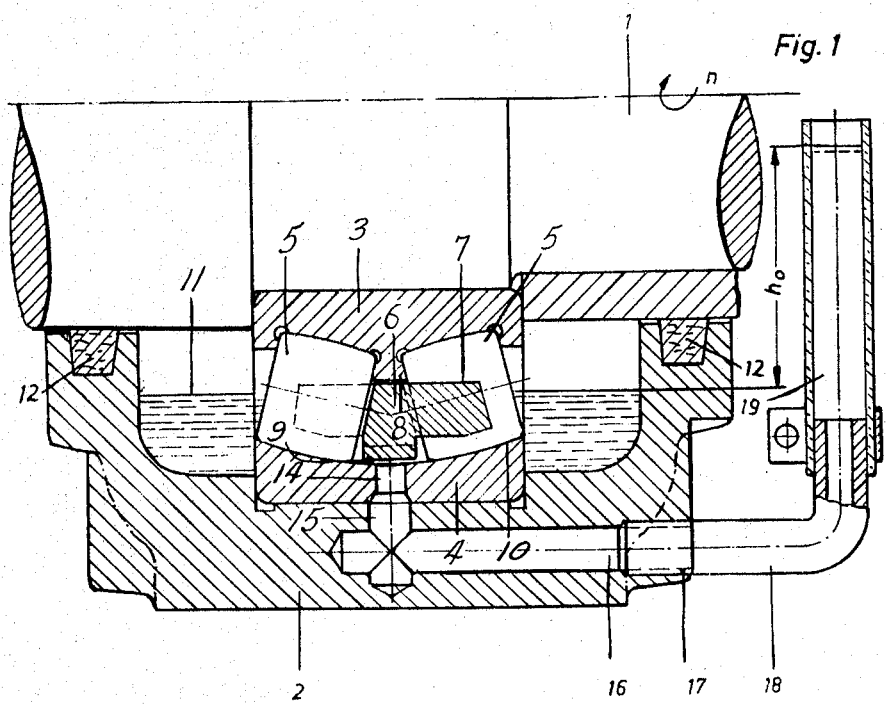
FIG. 1 is a longitudinal cross-sectional view showing the lower half of a self-aligning roller bearing according to the invention, the bearing forming part of a plummer bearing assembly.
Figure 2:
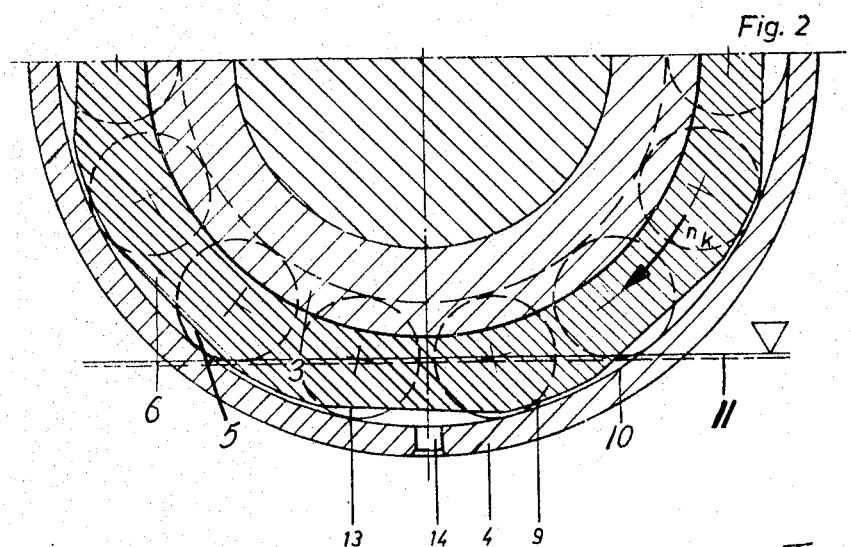
FIG. 2 is a transverse cross-sectional view of the arrangement of FIG. 1 showing, however, a different angular position of the roller cage.

In the arrangement shown in FIG. 1, a shaft 1 is supported for rotation, by means of a self-aligning roller bearing in the housing 2 of a plummer bearing or pillow block. The self-aligning roller bearing comprises an inner bearing race 3, an outer bearing race 4, a plurality of bearing rollers 5 disposed between the two races 3 and 4, and a roller cage 6 having transversely extending lugs 7 serving to retain the rollers in their desired circumferentially spaced relationship. The central radially projecting web 8 of the inner bearing race 3 serves to guide the roller cage 6 during the assembly of the bearing. As seen in FIG. 2, there is provided between the crowned outer peripheral surface 9 of roller cage 6 and the race surface 10 of the outer race ring 4 a narrow gap, the arrangement being such that, after assembly of the bearing, the roller cage 6 is guided by the race surface 10. In FIGS. 1 and 2 the level of the oil supply intended to lubricate the bearing and contained in the bottom part of bearing housing 2 is indicated at 11. Suitable annular seals 12 serve to exclude foreign material from the interior of the bearing housing and to prevent the oil from escaping along the shaft 1.

The crowned outer peripheral surface 9 of roller cage 6 is provided with a plurality of flats 13 enabling the cage to be assembled in position, the arrangement being such that there are a plurality of pockets between the roller cage and the outer bearing race 4, the pockets being filled with oil upon being immersed into the oil supply contained in the sump of the bearing housing. The outer race 4 is provided with a radial hole 14 disposed below the level 11 of the oil supply, the hole permitting oil to enter the drain passage 15 and 16, extending through the wall of the bearing housing 2. The outer end of passage 16 is provided with internal threads 17 receiving a pipe elbow 18 in such a manner that the free end of the elbow extends vertically upward. The free end of the elbow 18 carries an extension tube 19 made of glass, the upper end of the glass pipe being disposed above the level 11 of the oil supply.

Assuming that the shaft 1 together with the inner race 3 rotates at a speed $n$ as indicated by an arrow in FIG. 1, the roller cage 6 will rotate in the same direction but at a lower speed $n_k$, the outer race 4 remaining stationary. The rotation of roller cage 6 is indicated in FIG. 2 by an arrow marked $n_k$. From the gap existing between roller cage 6 and outer race 4, the lubricant is moved towards the radial hole 14 extending through the outer race 4. This will cause a positive pressure to be built up in the enclosed quantity of oil. The pressure causes oil to be pumped through the hole 14 and the passages 15 and 16 of the bearing housing, the result being that the lubricant column in the glass tube 19 rises. If the speed of the shaft $(n)$ is high, resulting in a correspondingly high speed $n_k$ of roller cage 6, the pressure surges of the oil introduced into the hole 14, the passages 15 and 16, the elbow 18 and the glass tube 19 occur in so rapid a succession that in practice no pulsation of the oil can be observed, the pressure head $h_0$ shown in FIG. 1 remaining constant.

Figure 3:
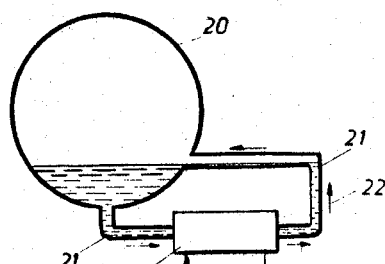
FIGS. 3 to 6 are diagrammatic showings of several examples of utilizing the antifriction bearing of the invention as a lubricant pump.

The antifriction bearing of the invention which is adapted to act as a lubricant pump may be used in a wide variety of applications. FIG. 3 in which the bore of the bearing housing receiving the outer race ring is indicated by the reference numeral 20, a pipe line 21 is connected to the oil drain hole of the bearing housing. This pipe line through which the oil flows in the direction of the arrows 22 leads to an oil cooler 23 whence it extends back to the bearing housing. The direction of coolant supply and discharge to and from the oil cooler is indicated by the arrows 24.

According to FIG. 2 showing again the bore 20 of the bearing housing 2, the pipe line 21 connected to the oil drain hole of the housing and the arrow 22 indicating the direction of oil flow, there is provided a storage reservoir 25 for the oil to be circulated through the bearing. This arrangement is particularly suitable for application in which it is impossible to accommodate within the bearing an oil supply which is sufficient to permit long servicing intervals to be specified.

Figure 4:
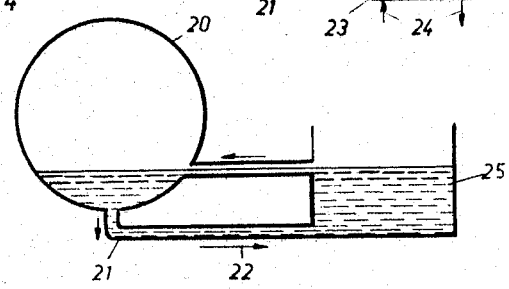
Figure 5:
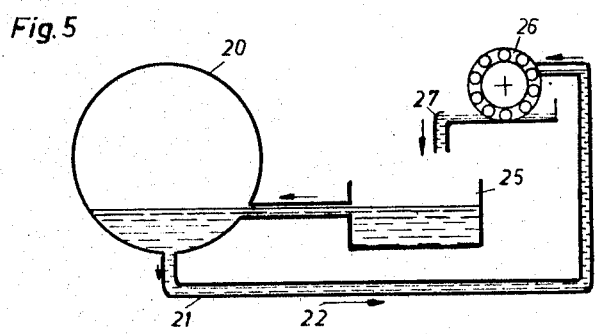

In FIG. 5, the reference numerals 20 through 22 and 25 have the same meaning as in FIG. 4. However, the pipe line 21 leads to another bearing 26 which is thus adapted to be lubricated by the circulating oil stream before the oil is returned to reservoir 25 by way of a pipe line 27, the oil coming from the second bearing 26 being returned by gravity to the antifriction bearing which acts as a lubricant pump.

Figure 6:
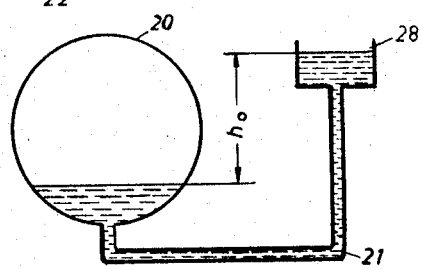

FIG. 6 shows an arrangement in which the dependence of the pressure head $h_0$ produced by the antifriction bearing acting as an oil pump on the speed of shaft 1 or roller cage 6, respectively, is used to control the oil level in bearing housing 2 as a function of shaft speed. It will be understood that the pressure head increases as the shaft speed is increased, the result being that increasing quantities of oil are displaced from bearing housing 2, the oil being pumped through pipe line 21 to the standpipe 28. The fact that the oil level in bearing housing 2 is lowered results in a decrease in lubricant friction losses which are known to be a function not only of the shaft speed but also of the oil level in the bearing housing. Thus, the arrangement of FIG. 6 will ensure that lubricant friction losses are reduced as the shaft speed is increased.

What is claimed is:

1. An immersion-lubricated antifriction bearing whose rotating parts are adapted to pump the lubricant into an external conduit system, wherein the action of pumping the lubricant is exclusively provided by the hydrodynamic pressure built up in the gap existing between a peripheral surface of a cage and the adjacent inner surface of a stationary outer race serving to guide the said cage, the oil subjected to the pumping action being discharged from the antifriction bearing through a hole provided in the lowermost portion of the surface guiding the cage.

2. The antifriction bearing of claim 1, wherein the oil level in the bearing housing is adapted to be controlled by means of a standpipe connected to the oil drain hole provided in the bearing housing, the standpipe being adapted to receive and store the lubricant which is displaced from the bearing housing at a high rotary speed of the bearing and to permit the stored oil to flow back automatically to the bearing upon the rotary speed thereof being reduced.

3. An antifriction bearing according to claim 1 in which a tubing interconnects the hole in the outer race to a bearing housing through which tubing circulation of the lubricant is accomplished.

4. An antifriction bearing according to claim 1 further comprising a cooler means, a tubing interconnecting said hole in the outer race to a bearing housing through said cooler means, circulation of the lubricant taking place through said tubing and cooler means.

5. An antifriction bearing according to claim 1 further comprising a lubricant supply container, a tubing interconnecting said hole in the outer race with a bearing housing through said supply container, circulation of said lubricant taking place through said tubing and container.

6. An antifriction bearing according to claim 1 further comprising a cooler means, a supply container and a tubing, said tubing interconnecting said cooler means and supply container between said hole in the outer race and a bearing housing to allow circulation of the lubricant therethrough.

7. An antifriction bearing according to claim 3 in which at least one additional bearing which is to be lubricated is located in the circulation path of the lubricant.

8. An antifriction bearing according to claim 4 in which at least one additional bearing which is to be lubricated is located in the circulation path of the lubricant.

9. An antifriction bearing according to claim 5 in which at least one additional bearing which is to be lubricated is located in the circulation path of the lubricant.

10. An antifriction bearing according to claim 6 in which at least one additional bearing which is to be lubricated is located in the circulation path of the lubricant.

References Cited by the Examiner
FOREIGN PATENTS
1,070,455 4/1954 Germany.

MARTIN P. SCHWADRON, *Primary Examiner.*

FRANK SUSKO, *Examiner.*